(12) United States Patent
Kloepping et al.

(10) Patent No.: US 8,652,553 B2
(45) Date of Patent: Feb. 18, 2014

(54) METHOD AND DEVICE FOR PRODUCING PUREED FOOD

(75) Inventors: Dorothee Kloepping, Schlangen (DE); Gerhard Brockmann, Aerzen (DE); Henry Rose, Hameln (DE)

(73) Assignee: Stephan Machinery GmbH, Hameln (DE)

( * ) Notice: Subject to any disclaimer, the term of this patent is extended or adjusted under 35 U.S.C. 154(b) by 193 days.

(21) Appl. No.: 13/213,791

(22) Filed: Aug. 19, 2011

(65) Prior Publication Data

US 2012/0064202 A1 Mar. 15, 2012

(30) Foreign Application Priority Data

Sep. 6, 2010 (DE) .................. 10 2010 044 630
Oct. 8, 2010 (EP) ..................... 10013464

(51) Int. Cl.
*A23L 1/212* (2006.01)

(52) U.S. Cl.
USPC ........... 426/233; 426/510; 426/518; 426/519; 426/523; 426/800; 426/801

(58) Field of Classification Search
USPC ................. 426/231–233, 510–511, 518–524, 426/800–801
See application file for complete search history.

(56) References Cited

U.S. PATENT DOCUMENTS

| | | | | |
|---|---|---|---|---|
| 2,086,338 A | * | 7/1937 | Sodergreen | 426/511 |
| 2,086,539 A | * | 7/1937 | De Bethune | 426/518 |
| 2,912,330 A | * | 11/1959 | Hawk et al. | 426/233 |
| 2,967,773 A | * | 1/1961 | Anderson | 426/233 |
| 3,506,407 A | | 4/1970 | Keith | |
| 3,852,487 A | * | 12/1974 | Van Werven et al. | 426/643 |
| 4,534,879 A | | 8/1985 | Iding et al. | |
| 4,960,601 A | * | 10/1990 | Cummins | 426/504 |
| 5,129,299 A | * | 7/1992 | Fischer et al. | 83/356.3 |
| 5,384,150 A | * | 1/1995 | Heeps | 426/646 |
| 5,723,166 A | | 3/1998 | Theuer et al. | |
| 6,368,654 B1 | * | 4/2002 | Evans et al. | 426/615 |
| 6,383,546 B1 | * | 5/2002 | Powrie et al. | 426/599 |
| 6,676,986 B1 | * | 1/2004 | Huttenbauer, Jr. | 426/646 |
| 7,008,657 B2 | * | 3/2006 | Falk et al. | 426/233 |
| 7,070,826 B2 | * | 7/2006 | Lidster et al. | 426/615 |
| 2005/0089615 A1 | * | 4/2005 | Arelli et al. | 426/521 |
| 2007/0202229 A1 | * | 8/2007 | Nielsen | 426/518 |

* cited by examiner

*Primary Examiner* — Drew E Becker
(74) *Attorney, Agent, or Firm* — Andrew M. Calderon; Roberts Mlotkowski Safran & Cole, P.C.

(57) ABSTRACT

A method, device, and knife system for producing puréed, cooked foodstuffs from piece-form raw material. The method includes pre-chopping of the piece-form raw material in a pre-chopping unit, cooking of the pre-chopped raw material in a cooking plant, and final processing of the cooked product in a final-processing unit. Before cooking, the piece-form raw material is cut into small pieces by the pre-chopping unit such that a pumpable mass is produced from the piece-form raw material.

28 Claims, 10 Drawing Sheets

METHOD AND DEVICE FOR PRODUCING PUREED FOOD

This application claims priority to German Application No. 10 2010 044 630.0 filed Sep. 6, 2010, and to European Application No. 10013464.2 filed Oct. 8, 2010, the contents of both of which are incorporated by reference herein in their entirety.

1. Field of the Invention

The invention relates to a method for producing puréed, cooked foodstuffs from piece-form raw material, in particular for use as food for small children or the elderly, having the following steps:
  pre-chopping of the piece-form raw material
  cooking of the pre-chopped raw material
  final processing of the cooked product
and also to a device for carrying out the method and a knife system for chopping foodstuffs.

2. Discussion of Background Information

It is known to process a broad spectrum of vegetable and meat types to form puréed convenience-food products. Both fresh and deep-frozen raw materials can be processed. Basic steps of generic methods are the chopping and cooking of the vegetables or of the meat and the subsequent cooling and optionally final processing. In this case, the raw material, which is present in relatively large pieces, for example as whole carrots or potatoes, is first of all cut into cubes having an edge length of about 10 mm and then is chopped further by a mincing machine. Perforated discs having a diameter of from 3 mm to 8 mm are usually used in this case. This type of chopping is associated with a loss of quality, since the product is squashed, cells are damaged and the product loses at least some of its juice. Liquid and solid components of the product separate and cause problems with both further processing and the quality of the end product.

Usually, the chopped product is then conveyed to a belt cooking plant by means of a rotary piston pump. On account of the separation of solid and liquid components, it is difficult to ensure a continuous flow of material through the pump and thus also into the belt cooking plant, and this can also be associated with the end product being cooked unevenly. Conventional belt cooking plants are also designed to be open so that the product is in contact with ambient air during the cooking process and ingredients can be oxidized. Thus, the colour and the taste of the product can be affected and this results in a substandard end product. Furthermore, the open design results in unsatisfactory energy efficiency, since both heat and moisture can escape uncontrollably.

In known methods, a fine chopper, which is equipped with an open hopper, is used for final processing. The product once again comes into contact with ambient air and can further oxidize. A cooking plant operating according to a known method has a space requirement of approx. 3 m by 10 m, and so a more compact plant is desirable.

SUMMARY OF THE INVENTION

It is the object of the present invention to provide a method and a device for producing puréed, cooked foodstuffs, which largely avoid the squashing of the raw material and thus a separation of the solid and liquid phase.

This object is achieved by a generic method, in which, before cooking, the piece-form raw material is cut into small pieces by a pre-chopping unit such that a pumpable mass is produced from the piece-form raw material.

In accordance with the method according to the invention, the raw material is cut so small by a knife system in a pre-chopping stage that it can be transported further by a pump and can be fed to a continuously chargeable cooking plant. On account of the exclusive use of a knife system for pre-chopping the piece-form raw material, the latter is only cut and not squashed, and so, compared with conventional methods, the product quality is increased since, compared with the usual methods, such as processing by the perforated discs of a mincing machine, the cell structure of the raw material is damaged much less and therefore there is no significant loss of juice by the product. This leads not only to higher quality of the end product but also to easier handling of the pre-chopped raw material, since no solid and liquid phases form and thus clogging of the pump following the pre-chopping can be reliably avoided.

Advantageously, the pre-chopping in the pre-chopping unit is carried out by means of a rotating knife system which consists of pre-cutting knives and a rotor-stator unit, which are driven by a common drive and preferably the rotational speed of which can be regulated.

The pump can be charged uniformly so that consequently also the continuously chargeable cooking plant can be supplied with a constant volume flow of raw material. In the cooking plant, the raw material can then be mixed and heated with direct steam in a manner proportional to quantity. The throughput of the system can in the process be regulated. During cooking, the product can be chopped further by means of an integrated knife system having rotor and stator.

Preferably, the pre-chopping unit forms, together with the continuously chargeable cooking plant, a closed system, so that the processed foodstuffs do not come into contact with ambient air, thereby minimizing undesired oxidation reactions. These features of the method, too, lead to increased quality of the end product. Furthermore, the energy efficiency of the entire system is improved, since no steam undesirably escapes and as a result moisture losses are reliably avoided and energy losses minimized.

Furthermore preferably, the method according to the invention is carried out in a completely closed system, so that the foodstuffs, after cooking, final processing and packaging, only come back into contact with ambient air at the consumer's, so that undesired oxidation reactions, which could have a negative effect on the taste and quality of the end product, are further minimized. Likewise, contamination or soiling of the product is ruled out.

The product heated with direct steam can then be fed continuously to a holding tube for cooking. Depending on the product to be processed and the desired end quality, various cooking times can be set. By way of a connected cooling system, the product can be cooled to below 95° C. and consequently depressurized, so that sudden evaporation of water is avoided.

Preferably, after cooking, the product is subjected to final chopping by means of a final-processing unit which can comprise a further knife system. This knife system, too, can comprise at least a rotor and a stator and its rotational speed can be regulated.

In a development of the invention, it is provided to measure the product pressure $p_{prod}$ at the inlet to the pre-chopping unit. This makes it possible to optimize the feed rate of the raw material, which can be fed for example via a screw conveyor, such that the optimum throughput is achieved, but clogging of the plant and thus a production downtime are reliably avoided. By comparing the measured product pressure $p_{prod}$ with a product-dependent reference pressure $p_{ref}$ which is determined separately beforehand, the optimum feed rate can be found and set. The automatic regulation operates here independently of the fine-cutting system used. Only the reference pressure $p_{ref}$ has to be determined separately for each product since, for example, fresh bread withstands a lower pressure than, for example, raw carrots. With such a configuration of the invention, the throughput of the plant can be increased considerably. At the same time, only a small temperature increase of the product is carried out and clogging and the breakage of the knives of the cutting systems are prevented.

To achieve the object, there is furthermore proposed a device for producing puréed, cooked foodstuffs from piece-form raw materials, in particular for use as food for small children or the elderly, said device comprising:
 a) a pre-chopping unit,
 b) a pump for transporting the pre-chopped raw material,
 c) a continuously chargeable cooking plant and
 d) a final-processing unit for the final processing of the foodstuff,
wherein the pre-chopping unit comprises a rotating knife system for processing the piece-form raw material to form a pumpable mass.

The exclusive use of a rotating knife system to chop the piece-form raw material before it is cooked not only causes an increase in quality of the end product but also greater reliability in the operation of the pump for transporting the pumpable mass and thus also affords procedural advantages.

Preferably, the individual modules and also the entire device are designed such that they form a closed system and the processed foodstuffs, once they have been fed to the first knife system, do not come into contact with ambient air throughout the rest of the production method. Undesired oxidation reactions and soiling can thus be effectively avoided.

The rotating knife system of the pre-chopping unit comprises preferably at least a stator, a rotor and a delivery disc.

In order to be able to set the fineness of consistency of the end product, the rotating knife system of the final-processing unit can have particularly small knife gaps. Knife gaps of 0.05 mm or less are possible.

The rotor-stator systems of the knife systems used can operate in a contactless manner so that metal/metal contact is avoided and thus the lifetime of the systems is increased.

Preferably a pressure sensor can be arranged at the inlet to the pre-chopping unit. As a result, the throughput through the plant can be maximized and at the same time the reliability increased, since clogging, downtime and knife breakages are avoided. Furthermore, processing which is even more product-conserving can be achieved, since squashing at the inlet to the pre-chopping unit is avoided.

The invention also includes a rotating knife system for chopping foodstuffs, said system having a rough cutter and at least two cutting sets. The unchopped product is first of all roughly chopped by the rough chopper and subsequently chopped further by the at least two cutting sets. The cutting sets each comprise a rotor or cutting head and a stator or cutting ring. The pairs of terms rotor/cutting head and stator/cutting ring each have here the same meaning and can be used synonymously. Advantageously, a cutting set which is run through later has smaller knife gaps than the cutting set or sets that have respectively been run through previously, in order that the product is chopped progressively smaller.

According to the invention, the rough cutter can be adapted to the product to be processed and optionally to the following cutting sets, in that a variable number of blades, i.e. for example 3, 4 or 6 blades, can be fitted. Three or more following cutting sets are likewise conceivable.

The structure of the knife system with a rough cutter and at least two cutting sets allows relatively precisely defined heating of the product during processing. This is advantageous for many deep-frozen raw materials, since in this way it is possible to dispense with a separate defrosting stage. It is also possible to process products containing chocolate.

BRIEF DESCRIPTION OF THE DRAWINGS

An exemplary embodiment of the invention will be described in more detail in the following text with the aid of a drawing, in which.

DETAILED DESCRIPTION OF THE PRESENT INVENTION

Figure 1:
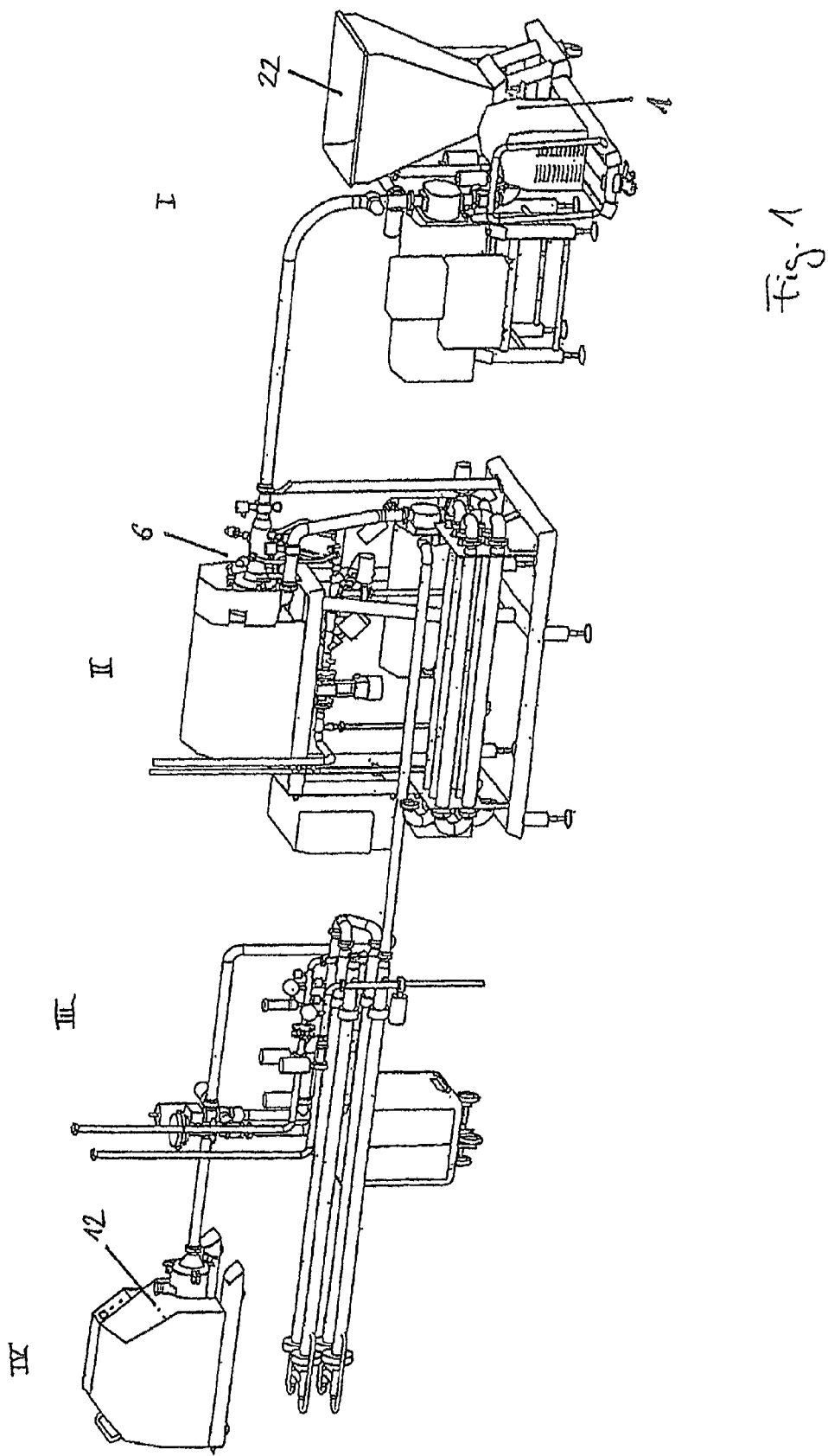
FIG. 1 shows a view of a device according to the invention for carrying out a method according to the invention.

FIG. 1 shows an overview of a plant for carrying out a method according to the invention. The raw material is in this case introduced into the hopper 22 and then runs in succession, from right to left in the figure, through the regions of pre-chopping I with the pre-chopping unit 1, heating by means of direct steam in the cooking plant 6, fine chopping and cooking in the holding tube II, cooling system III and final processing IV with the final-processing unit 12. The entire system is designed in a closed manner so that the processed foodstuffs, once they have been introduced into the hopper 22, no longer come into contact with ambient air. Furthermore, the plant shown in FIG. 1 has a much smaller space requirement than plants that operate by a conventional method.

Figure 2:
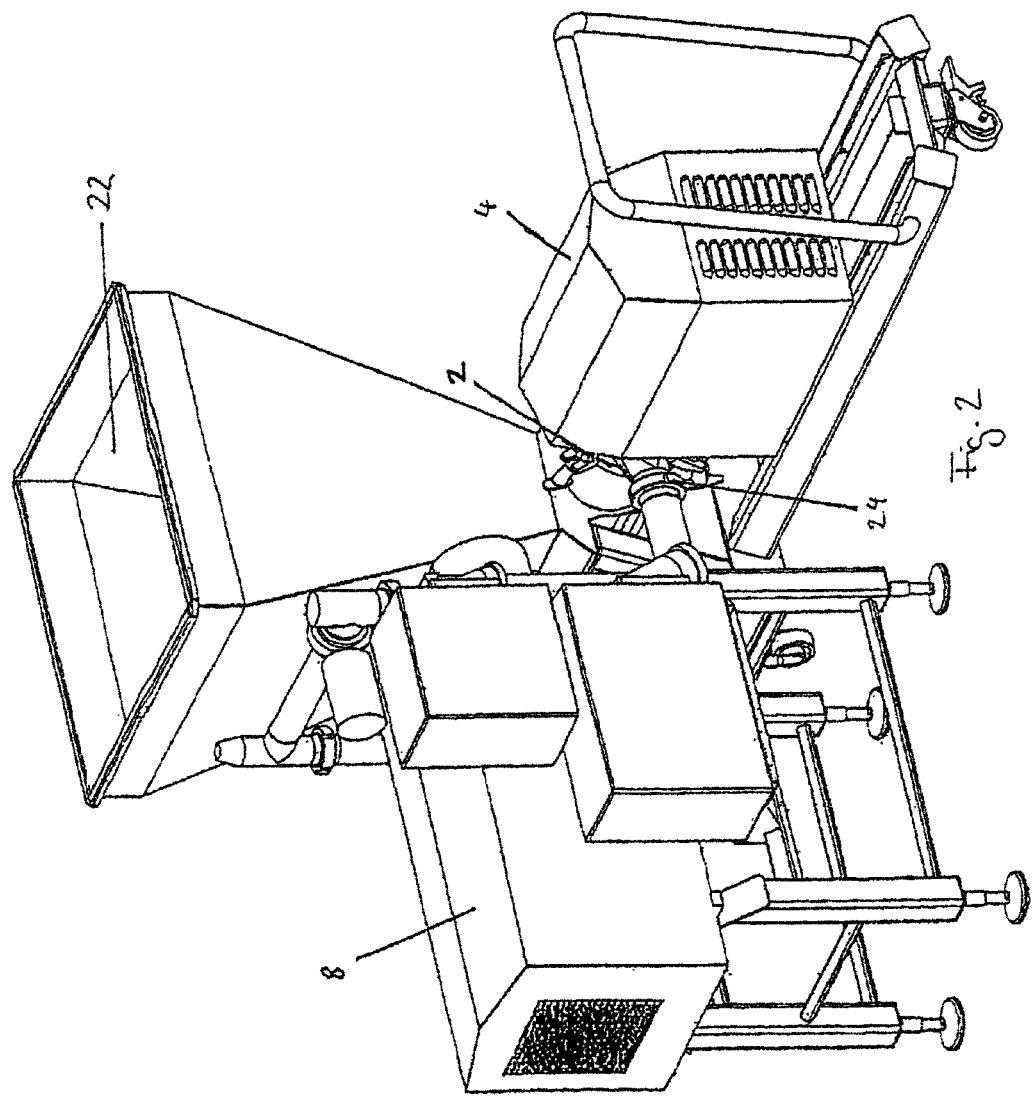
FIG. 2 shows a perspective view of the pre-chopping unit.

FIG. 2 shows a more detailed view of the region I from FIG. 1. The unchopped raw material is fed to the hopper 22 via a mechanism (not illustrated here), such as a screw conveyor, for example. The piece-form raw material is then chopped by the knife system 2, which has its own drive 4, and transported further through the tangential outlet 24 by means of a pump 8.

Figure 3:
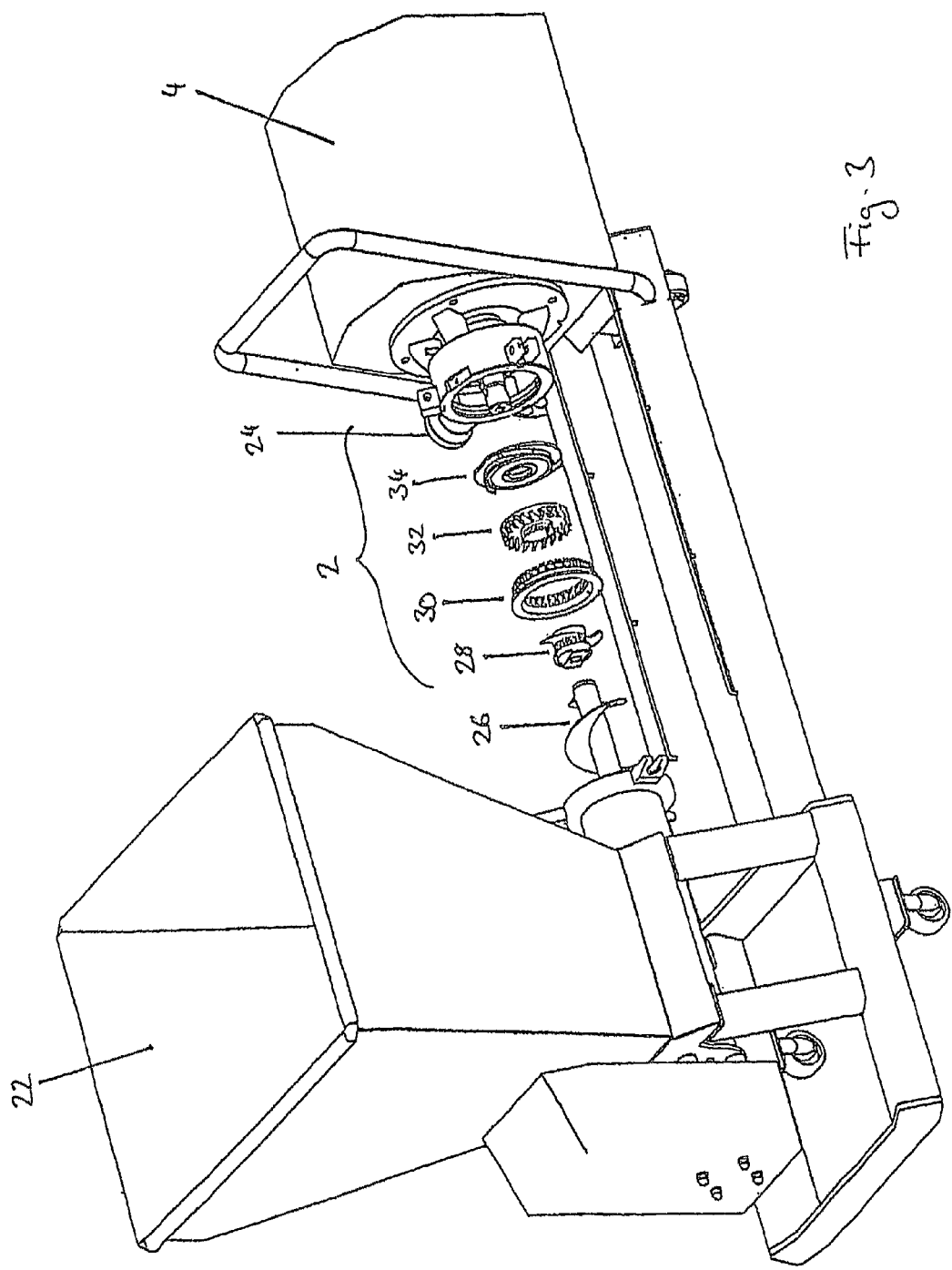
FIG. 3 shows an exploded view of the pre-chopping unit.

FIG. 3 illustrates the structure of the knife system of the pre-chopping unit 1. The unchopped raw material is introduced into the hopper 22 and then transported to the right in the drawing by the feed screw 26 which is in turn equipped with its own drive. This transport takes place in a manner which is gentle to the raw material so that it is not damaged. The knife system 2 consists of a rough cutter 28, a stator 30 having specific knife gaps, a rotor 32 having a number of teeth that is adapted to the use purpose, and a delivery disc 34. The raw materials are exclusively cut by this knife system 2 and not, as in conventional chopping methods, squashed, and so the emergence of liquid is minimized and the pumpability of the chopped raw material is ensured. The knife system 2 is frequency-regulated and can reach rotational speeds of up to 4000 rpm or more. The chopped raw material leaves the knife system 2 through the tangential outlet 24. The orientation of the tangential outlet 24 with respect to the axis of rotation and thus the direction of further transport can in this case be adapted to the space conditions.

Figure 4:
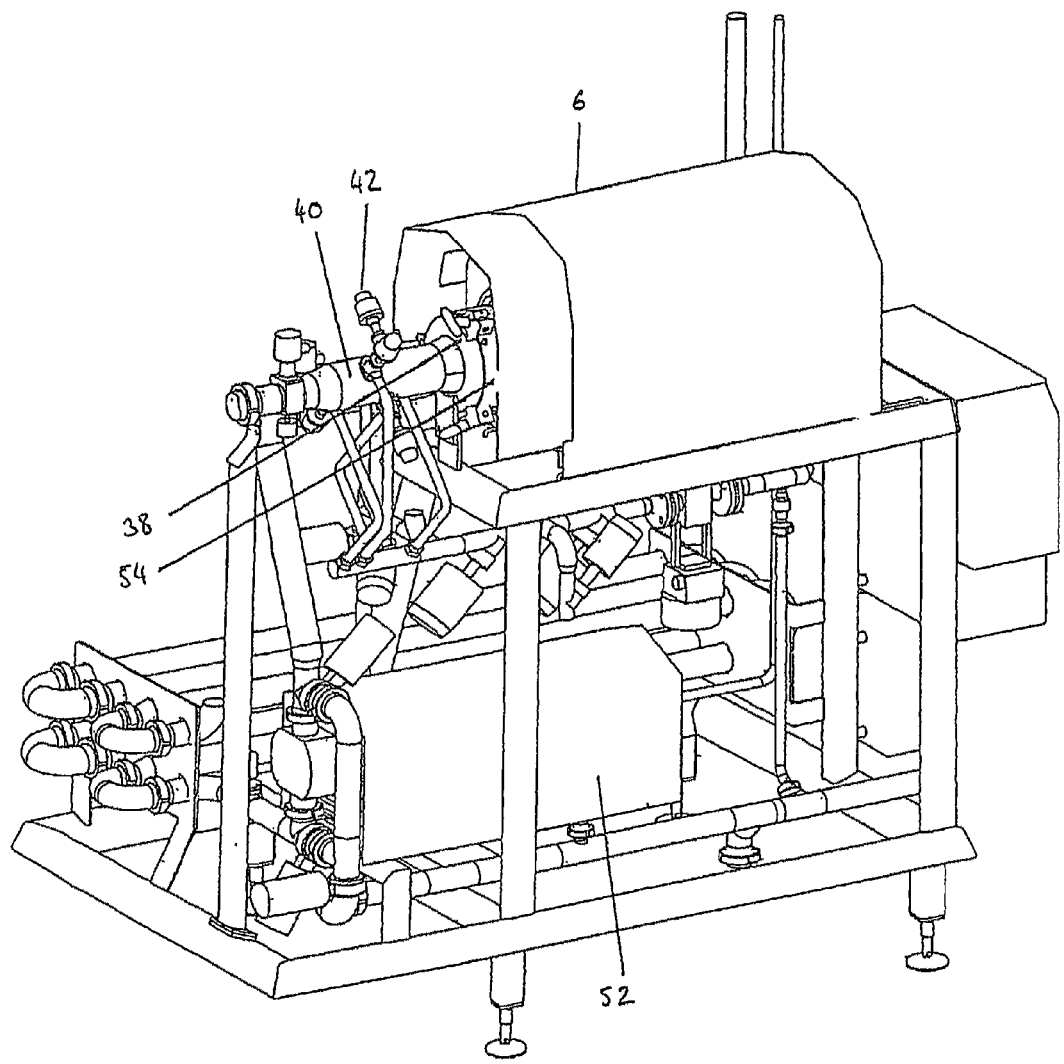
FIG. 4 shows a perspective view of the cooking plant.

FIG. 4 shows a view of the region II from FIG. 1, in which the raw material is heated by mixing with direct steam. In this case, the pre-chopped raw material is fed—from the left in the drawing—to the pre-mixing region 40. So much steam is admitted continuously and in a manner proportional to quantity through the specifically constructed steam nozzles 42 that the desired temperature is reached. Within the cooking plant 6 there is a further knife system 38, which further chops the product during heating. The injected steam condenses in the pressurized knife system 38 and exits via the tangential outlet on the housing 54. The pressure in the knife system 38 is regulated via the subsequent pump 52, as a result of which heating temperatures of over 100° C. can also be achieved.

Figure 5:
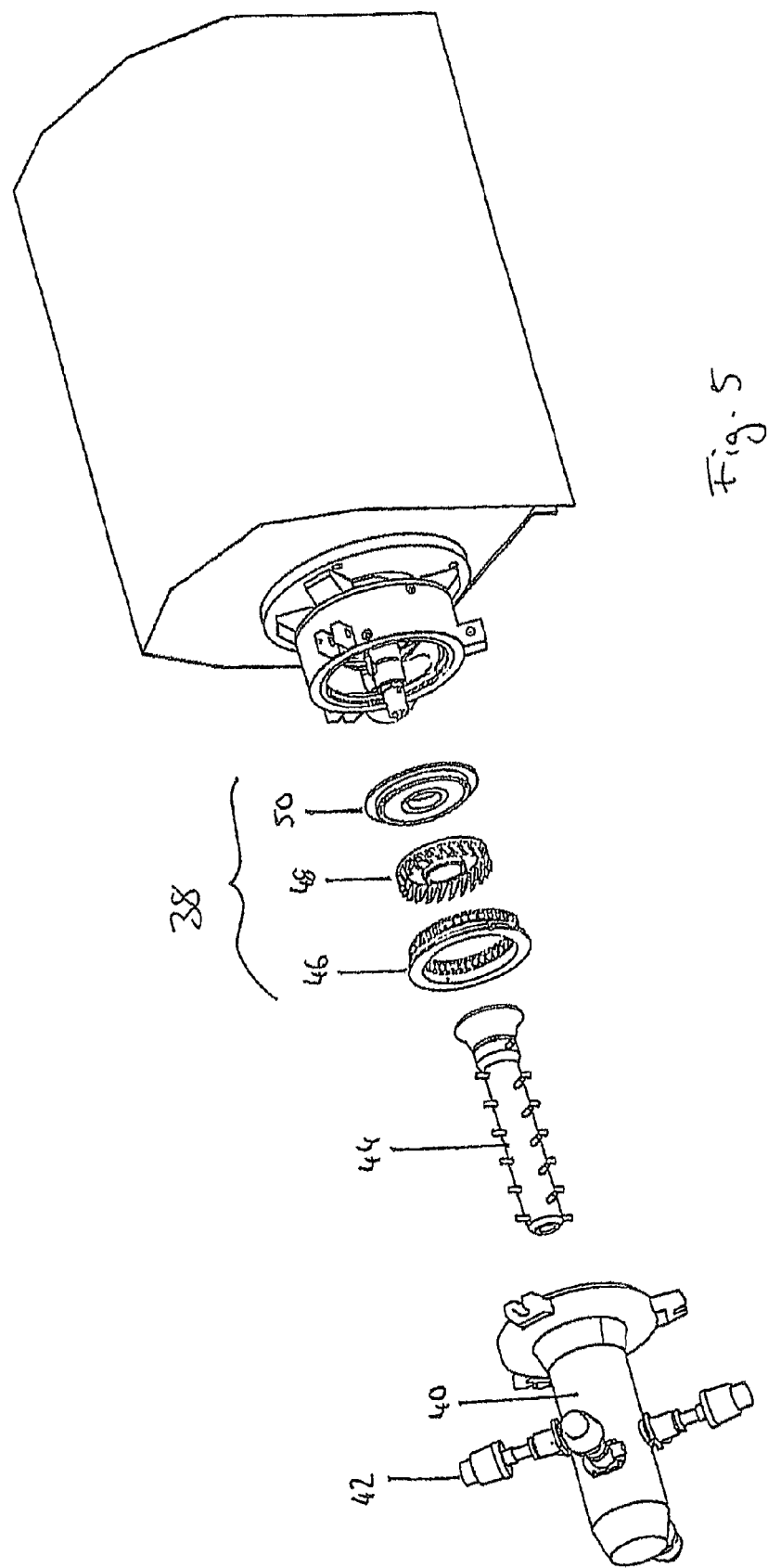
FIG. 5 shows an exploded view of the knife system which is integrated into the cooking plant.

FIG. 5 shows a detailed exploded illustration of the cooking plant 6 from FIG. 4. The premixing region 40, already described in FIG. 4, having the steam nozzles 42 can be seen, as can the mixing shaft 44, the stator 46 having specific knife gaps, the rotor 48 having a number of teeth that is adapted to the use purpose, and also the delivery disc 50.

Figure 6:
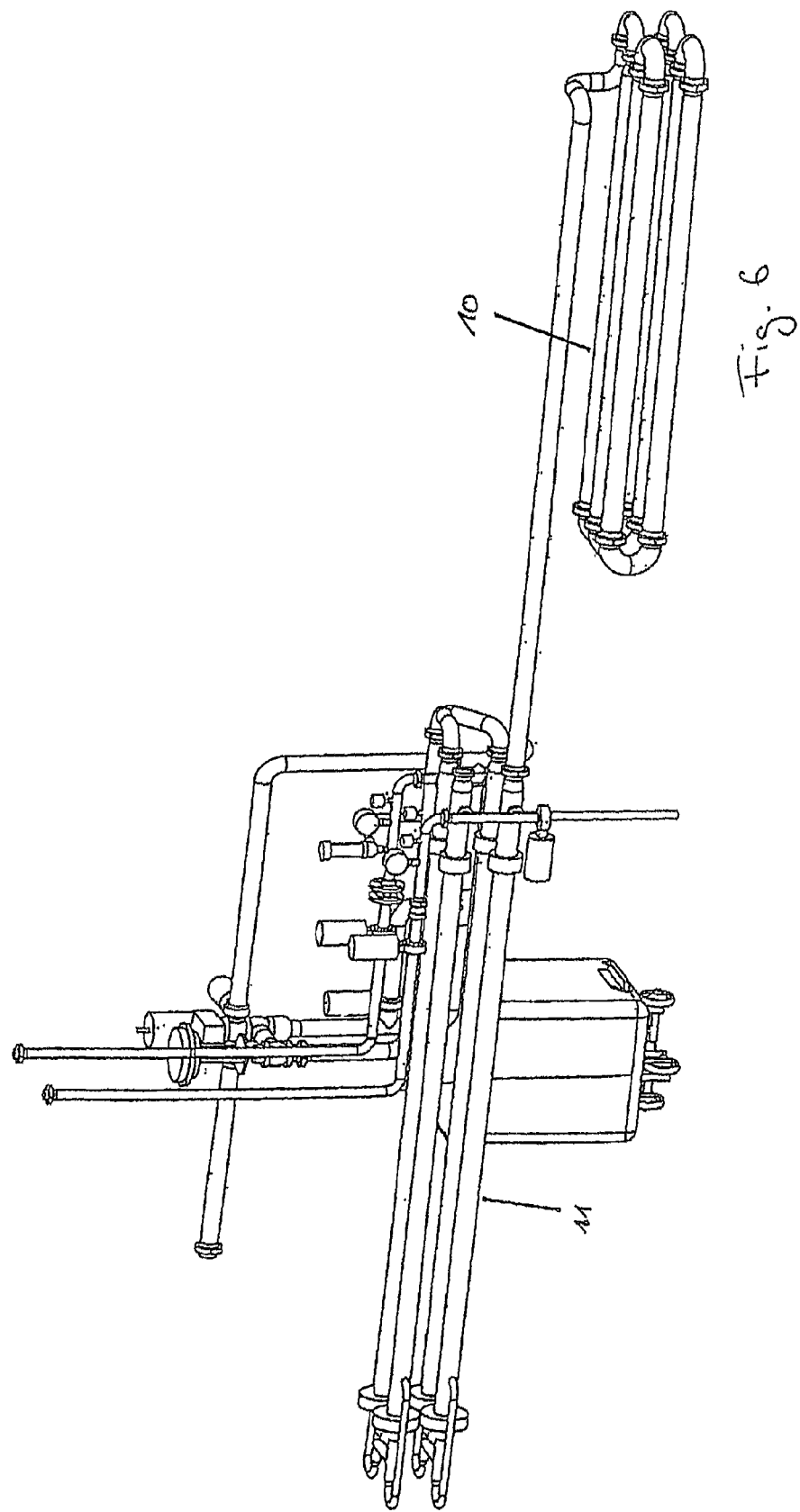
FIG. 6 shows a perspective view of the holding tube.

FIG. 6 shows the holding tube 10 from the region II and the cooling system 11 from the region III in FIG. 1. The chopped and already heated product passes through a number of parallel tubes and is cooked in the process. It is fed into the tubular system at the bottom right in the drawing and leaves it again in the upper left-hand region of the figure. Different cooking times can be realized by adapting the tubular system and thus products having different requirements can be processed. Subsequently, the product is cooled in the cooling system 11 to a temperature at least below 95° C. so that after cooling the product can be depressurized and sudden evaporation of water is avoided.

Figure 7:
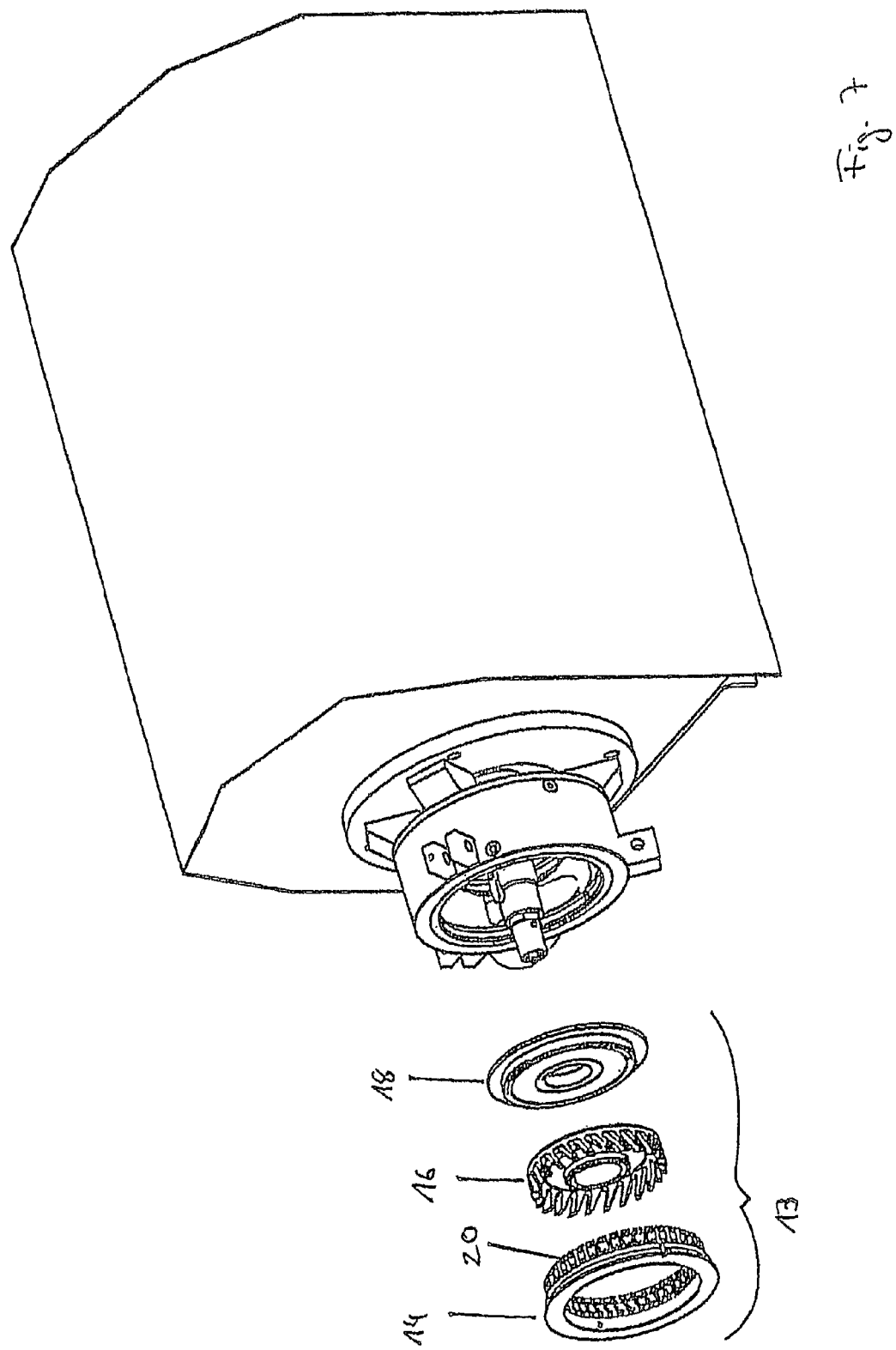
FIG. 7 shows an exploded drawing of the knife system of the final-processing unit.

FIG. 7 shows an exploded illustration of the final-processing system 12 from section IV in FIG. 1. The knife system 13 used here consists likewise of a stator 14 having specific knife gaps 20, a rotor 16 having a number of teeth that is adapted to the use purpose, and a delivery disc 18. The knife system 13 can be frequency-regulated and reach rotational speeds of 4000 rpm or more. By setting the rotational speed and the selected knife gap 20, the degree of fineness of the end product can be set. Knife gaps 20 of 0.05 mm are, depending on the desired uniformity of the product, possible, as are larger or smaller knife gaps 20.

Figure 8:
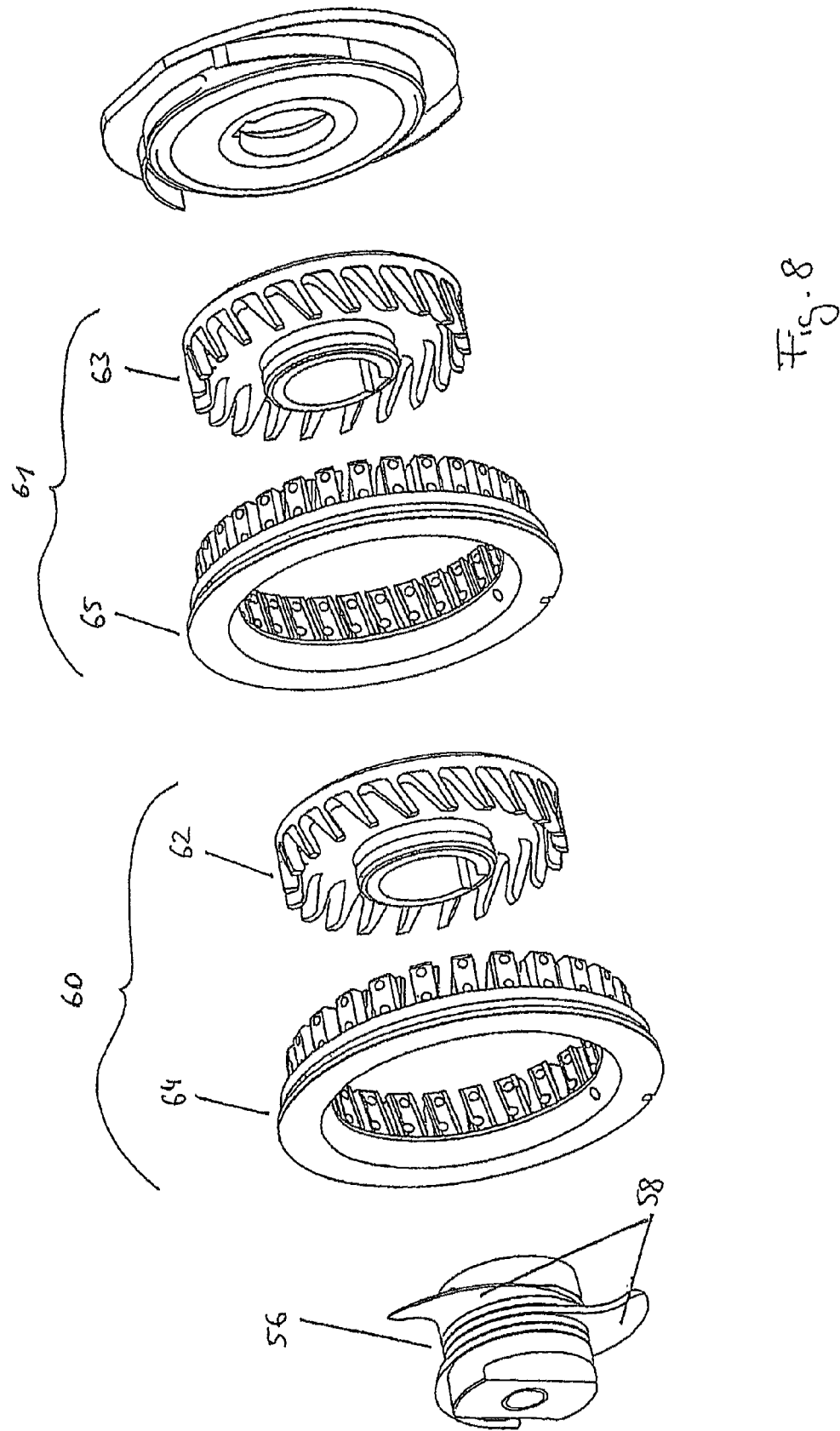
FIG. 8 shows an exploded drawing of a knife system having two cutting sets.

FIG. 8 shows an exploded illustration of a rotating knife system having two cutting sets 60, 61. The product to be chopped moves from left to right in the drawing and in the process is first of all roughly chopped by the rough cutter 56 and at the same time transported to the following cutting set 60. In the exemplary embodiment shown, the rough cutter 56 is equipped with three blades 58, but the number of blades can be adapted in a variable manner to the use purpose. In the cutting set 60, the rotor 62 moves with respect to the stator 64 and thus chops the product further. Expediently, the cutting set 61, which consists likewise of a rotor 63 and a stator 65, is designed to further increase the degree of fineness of the product. By adapting the knife gaps of the cutting sets 60, 61 the desired degree of fineness can be achieved.

Figure 9:
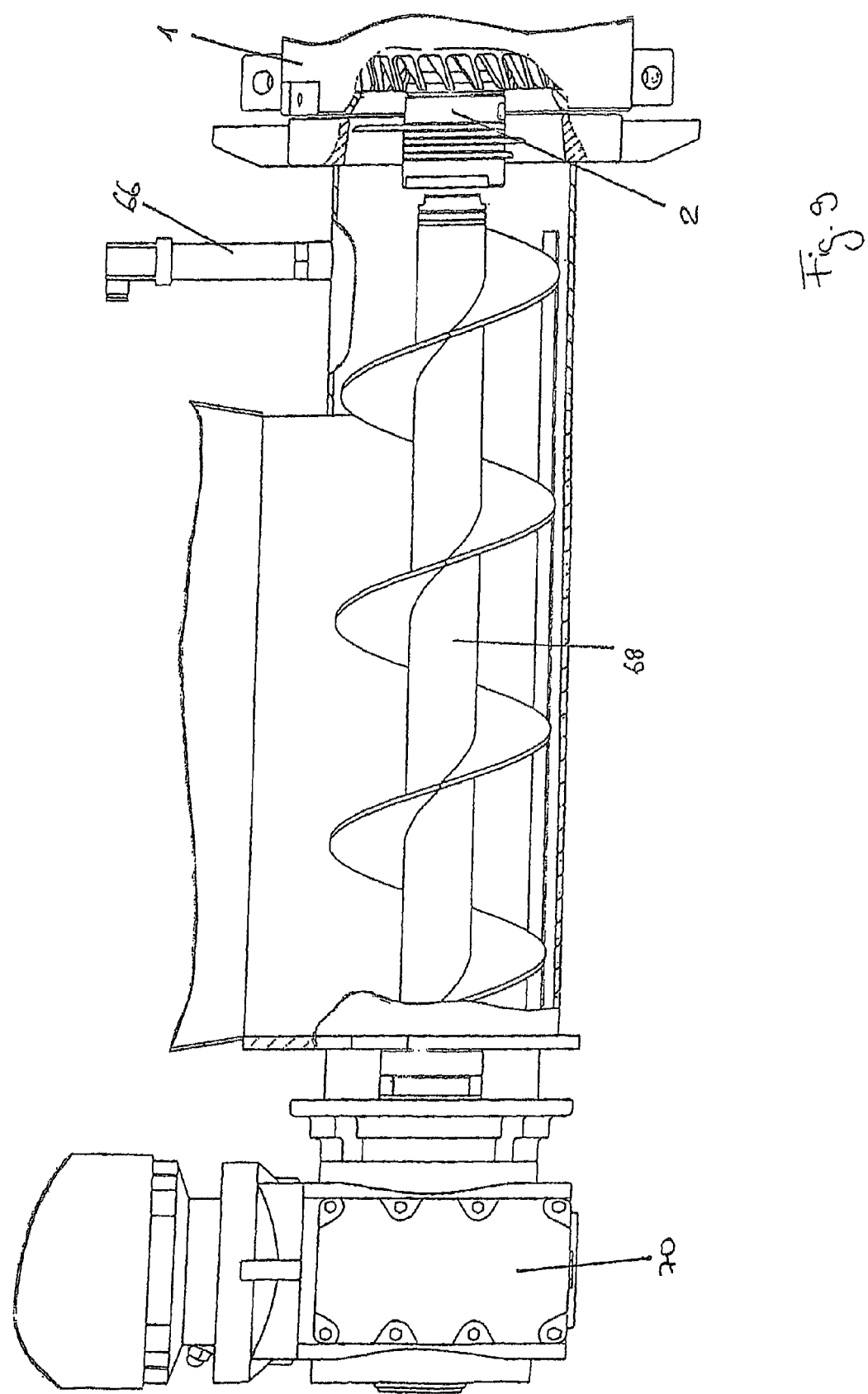
FIG. 9 shows an exemplary embodiment of a screw conveyor having a pressure sensor.

FIG. 9 shows a possible exemplary embodiment of the feed screw 68, which transports the piece-form raw material to the knife system 2 of the pre-chopping unit 1. The screw conveyor 68 is driven in this case by a geared motor 70 that can be regulated. The pressure built up by the product flow towards the knife system 2 is detected by the pressure sensor 66. A suitable regulation system can then be used to set the feed rate such that the system achieves as high a throughput as possible without clogging.

Figure 10:
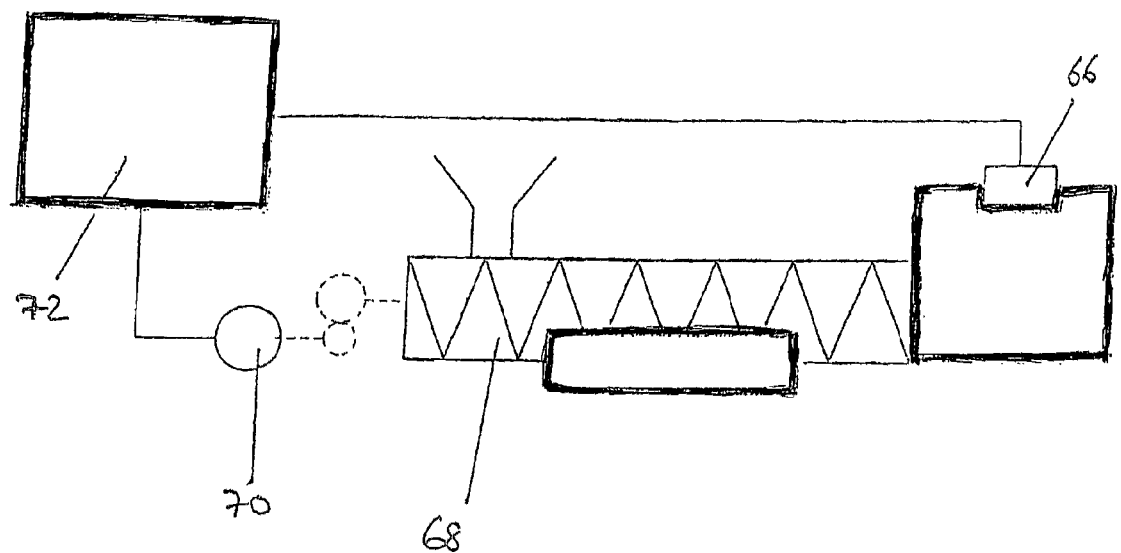
FIG. 10 shows a control scheme for regulating the speed of the screw conveyor.

FIG. 10 shows a possible control scheme for regulating the speed of the feed screw 26. A pressure sensor 66 measures the product pressure $p_{prod}$ brought about by the screw conveyor 68. The electronics of the speed regulator 72 compare the product pressure $p_{prod}$ measured with a previously determined, product-specific reference pressure $p_{ref}$ and increase the speed of the motor 70 that drives the screw conveyor 68 as long as $p_{prod}$ is less than $p_{ref}$. As soon as the product pressure $p_{prod}$ exceeds the reference pressure $p_{ref}$, the speed regulator 72 reduces the speed of the geared motor 70, and so the screw conveyor 68 transports a smaller quantity of product per unit time and clogging of the system is prevented.

The maximum permissible reference pressure $p_{ref}$ can be determined easily in the case of water-containing products such as fruits or vegetables, for example. For example, a sample cylinder having a cross-sectional area of, for example, 10 cm² can for this purpose be filled with the product to be processed. Using a punch, the product is then compressed and a pressure sensor embedded in the wall is used to measure the pressure. As soon as juice emerges from the product, the permissible pressure has as a rule been exceeded. Once a safety amount has been subtracted, $p_{ref}$ can be established from this limit pressure.

The invention claimed is:

1. A method for producing pureed, cooked foodstuffs from piece-form raw material, comprising the following steps:
   pre-chopping of the piece-form raw material in a pre-chopping unit,
   cooking of the pre-chopped raw material in a continuously chargeable cooking plant,
   final processing of the cooked product in a final-processing unit,
   wherein, before cooking, the piece-form raw material is cut into small pieces in the pre-chopping unit such that a pumpable mass is produced from the piece-form raw material.

2. The method according to claim 1, wherein the pre-chopping in the pre-chopping unit is carried out by means of a first rotating knife system.

3. The method according to claim 1, wherein the pumpable mass is mixed and heated with direct steam in the continuously chargeable cooking plant.

4. The method according to claim 1, wherein the continuously chargeable cooking plant represents a closed system and contact between the foodstuffs to be cooked and ambient air is prevented.

5. The method according to claim 4, wherein the foodstuff to be processed remains isolated from ambient air throughout the pre-chopping, cooking and final processing.

6. The method according to claim 1, wherein, after cooking, the foodstuffs are cooled to below 95° C. by means of a cooling system.

7. The method according to claim 1, wherein the final processing in the final-processing unit is carried out by means of a rotating knife system.

8. Method according to claim 7, wherein the rotating knife system is frequency-regulated.

9. The method according to claim 1, wherein the product pressure ($p_{prod}$) is measured at an inlet to the pre-chopping system.

10. The method according to claim 9, wherein the product pressure ($p_{prod}$) measured is used to regulate the feed rate of the raw material.

11. The method according to claim 1, wherein the pre-chopping prevents separation of solid and liquid phase of the piece-form raw material.

12. The method according to claim 11, wherein the pre-chopping only cuts the piece-form raw material.

13. The method according to claim 1, wherein the piece-form raw material is supplied to the continuously chargeable cooking plant in a constant volume flow.

14. The method according to claim 1, wherein the piece-form raw material is mixed and heated with direct steam in a manner proportional to quantity.

15. The method according to claim 1, further comprising chopping the piece-form raw material during the cooking.

16. The method according to claim 15, wherein after cooking, the piece-form raw material is chopped.

17. The method according to claim 1, wherein the measured product pressure ($p_{prod}$) is compared with a product-dependent reference pressure ($p_{ref}$) regulate the feed rate of the raw material.

18. The method according to claim 17, wherein the product-dependent reference pressure ($p_{ref}$) is determined before the measured product pressure ($p_{prod}$) and separately therefrom.

19. The method according to claim 18, wherein the product-dependent reference pressure ($p_{ref}$) is determined separately for each product by:
   placing a sample of the product in a sample vessel;
   compressing the sample with a punch;
   determining a pressure of the sample when juice emerges from the sample during the compressing; and
   subtract a safety amount from the determined pressure to establish the product-dependent reference pressure ($p_{ref}$).

20. The method according to claim 17, wherein the comparing is an automatic regulation operating independent of any cutting system.

21. The method according to claim 17, wherein the comparing regulates a speed of the piece-form raw material during the cooking.

22. The method according to claim 21, wherein the speed is increased when the measured product pressure ($p_{prod}$) is less than the product-dependent reference pressure ($p_{ref}$) and the speed is reduced when the measured product pressure ($p_{prod}$) exceeds the product-dependent reference pressure ($p_{ref}$).

23. The method according to claim 1, wherein knife systems of the at least one of pre-chopping and end processing units have an axis of rotation that is parallel to the product's direction of transportation.

24. The method according to claim 23, wherein the knife systems comprise a rotor and a stator.

25. The method according to claim 23, wherein the knife systems are rotating knife systems with knife gaps smaller than 0.05 mm.

26. The method according to claim 1, wherein after pre-chopping, the product is further chopped during the cooking to increase a surface of the product during the cooking.

27. The method according to claim 26, wherein during and via the chopping, the product is already heated by a certain amount.

28. The method according to claim 1, wherein the product is packed up while separated from ambient air.

* * * * *